United States Patent [19]

Ackerman

[11] 4,316,720
[45] Feb. 23, 1982

[54] MAINTENANCE TRAINING DEVICE

[75] Inventor: Morris Ackerman, Chevy Chase, Md.

[73] Assignee: The Singer Company, Binghamton, N.Y.

[21] Appl. No.: 23,982

[22] Filed: Mar. 26, 1979

[51] Int. Cl.³ .............................................. G09B 9/00
[52] U.S. Cl. .................................... 434/224; 434/366
[58] Field of Search ............... 35/8 R, 9 R, 9 A, 9 B, 35/10, 13, 12 F, 19 A; 364/200, 801, 900; 434/224, 366

[56] References Cited

U.S. PATENT DOCUMENTS

| | | | |
|---|---|---|---|
| 3,061,945 | 11/1962 | Hawkins | 35/13 |
| 3,363,333 | 1/1968 | Alexander | 35/19 A |
| 3,656,242 | 4/1972 | Atkinson | 35/19 A |
| 4,070,705 | 1/1978 | Lockwood et al. | 35/10 X |
| 4,091,550 | 5/1978 | Schrenk et al. | 35/19 A |
| 4,213,253 | 7/1980 | Gudelis et al. | 434/224 |

*Primary Examiner*—William H. Grieb
*Attorney, Agent, or Firm*—Jeff Rothenberg; Stanton D. Weinstein; Ronald Reichman

[57] ABSTRACT

This disclosure illustrates and describes a system that permits a student to receive hands-on maintenance training of electronic systems without interfering with the operation of the electronic system. The students are taught how to repair and maintain the electronic system by trying to locate defective simulated components that may be used to drive and control the electronic system. The simulated components are controlled by a computer and they will only malfunction when an instructor enters an instruction into the computer which causes that particular electronic component to be defective.

12 Claims, 5 Drawing Figures

MAINTENANCE TRAINING DEVICE

BACKGROUND OF THE INVENTION

1. Field of the Invention

This invention relates to electronic systems and more particularly to systems for teaching students how to repair and maintain electronic equipment.

2. Description of the Prior Art

Man has been able to change his environment by inventing and developing various types of machines and equipment. As man's ability to change his environment has increased, the complexity of the machines and equipment used by man increased. Some of the machines and equipment currently used by man are very expensive and/or only one machine or piece of equipment is available at a specific location, i.e., a power plant or power plant simulator. No machine or piece of equipment is one hundred percent reliable, and no machine or piece of equipment is useful unless it works. Thus, all machines and equipment must be repaired and/or undergo periodic preventive maintenance.

Preventive maintenance has been defined as a system of routine inspection and replacement of certain system components. The type of inspection employed depends upon the type of equipment being inspected and the manner in which the equipment is used. The inspection may require proof testing of parts of the equipment or complete testing of the equipment. More specifically, the term "preventive maintenance" applies to systematic maintenance desiged to minimize or forestall further equipment operating problems or failures by making minor or necessary repairs in advance of major operating difficulties.

In order for machines and equipment to remain operational the machines and equipment must be repaired and maintained by people. As the complexity of the equipment increases, the amount of knowledge someone must have to maintain and repair the equipment increases. Equipment is repaired because it is economically more feasible to fix the equipment than to throw it away. People usually learn how to repair and maintain equipment by repairing the actual equipment. While people are learning how to maintain the equipment, The equipment cannot be utilized for the purposes for which it was purchased. Thus, where the operational or cost requirements are such that maximum availability of the equipment is required it is very difficult for students to obtain enough hands-on training on the actual equipment.

One method used by the prior art to teach maintenance training was for an instructor to insert a defective printed circuit (PC) card in an electronic system so that a student may try to find the defective component and fix the system. In the event that the instructor did not have any defective components, he made defective components, by carefully removing printed circuit cards from the electronic system and placing some tape on some of the printed circuit cards contacts before returning the printed circuit cards to their proper location. If the student analyzed the problem correctly the student will only remove defective printed circuit cards, and the instructor would inform the student that he had solved the problem, and should now replace the defective PC card with a good PC card. Some of the disadvantages of the foregoing procedure is that good PC cards may be damaged by being removed or taped. the instructor must watch the student to ensure that the student removes the proper PC card and replaces it correctly. To insure that the system works correctly after the student's training, the instructor must be aware of every defective PC card that was placed in the electronic system.

SUMMARY OF THE INVENTION

This invention overcomes the disadvantages of the prior art by permitting a student to receive hands-on maintenance training of electronic systems without interfering with the system's operation. Students are taught how to repair and maintain the electronic equipment as if the electronic equipment is being used for its intended purpose.

The apparatus of this invention utilizes a computer. The instructor enters malfunctions (instructions that inform the apparatus of this invention to cause certain parts of the actual electronic equipment to behave improperly) into the computer. The computer causes apparatus of this invention to stimulate the actual electronic equipment. The actual electronic equipment will realistically respond to any entered malfunctions and the actual equipment will work in the same manner and produce the same indications that defective equipment would exhibit under like circumstances. The foregoing is accomplished by producing a simulated electronic rack of the electronic components contained in the actual electronic equipment. The rack containing the simulated electronic equipment may be comprised of simulated PC cards, simulated modules, simulated electronic components, etc.

The simulated electronic components are visually, electrically and functionally similar to the actual electronic components of the actual electronic system. The simulated rack looks like and operates in the same fashion as the actual electronic equipment. Furthermore, the simulated rack would react to a student-entered diagnostic program in the same manner as does the actual equipment.

Thus, the simulated rack is used to duplicate the actual equipment so that an individual will be able to train on the simulated rack and receive the same or better training than he receives on the actual equipment. For instance, if one wanted to teach a student how to repair a cathode ray tube (CRT) that was a part of a power plant simulator, the simulated rack would contain simulated PC cards or other simulated electronic components that comprise the CRT.

The simulated PC cards would have the same test points as the PC cards that are found in the actual CRT. When a student would place some test equipment, like an oscilloscope, ohmmeter, voltmeter, etc., on any of the simulated PC cards test points, the test equipment would have the same readings and display the same information as test equipment would on the actual CRT. Thus, as far as the student is concerned, the simulated electronic components found in the simulated rack would look like and perform like the actual electronic components.

The instructor will be able to insert various malfunctions into this system and cause various defects in one or more of the simulated electronic components found in the simulated racks. At this point, the student would try to determined what was wrong with the CRT. For instance, if one actual PC card caused the information that appears on the CRT screen to look fuzzy when it shouldn't, then the simulated PC card that looked like the actual PC card would also cause the actual CRT to look fuzzy. The student would try to repair the CRT by stopping it from looking fuzzy. He would not repair the actual CRT since the actual CRT is not broken. He would attempt to repair the electrical components found in the simulated racks. Thus, if the student made a mistake he would not destroy the actual CRT's components. If the student determines the cause of the CRT's problem, he would remove the defective simulated electrical component or components and replace them with working components. Once the student placed simulated working components in the positions of the defective components, the fault would be removed and the actual CRT would function properly. By being trained in the foregoing manner the student will have the value of training on actual equipment while he is using simulated equipment.

It is an object of this invention to provide a new and improved system for teaching people how to repair and maintain electronic equipment and electronic machinery.

It is another object of this invention to provide a new and improved system that permits people to learn how to repair electronic equipment while the electronic equipment is being used for other purposes.

It is a further object of this invention to provide a new and improved maintenance training system that utilizes a computer.

Further objects and advantages of this invention will become more apparent as the following description proceeds, which invention should be considered with the accompanying drawings.

DESCRIPTION OF THE PREFERRED EMBODIMENT

Figure 1:
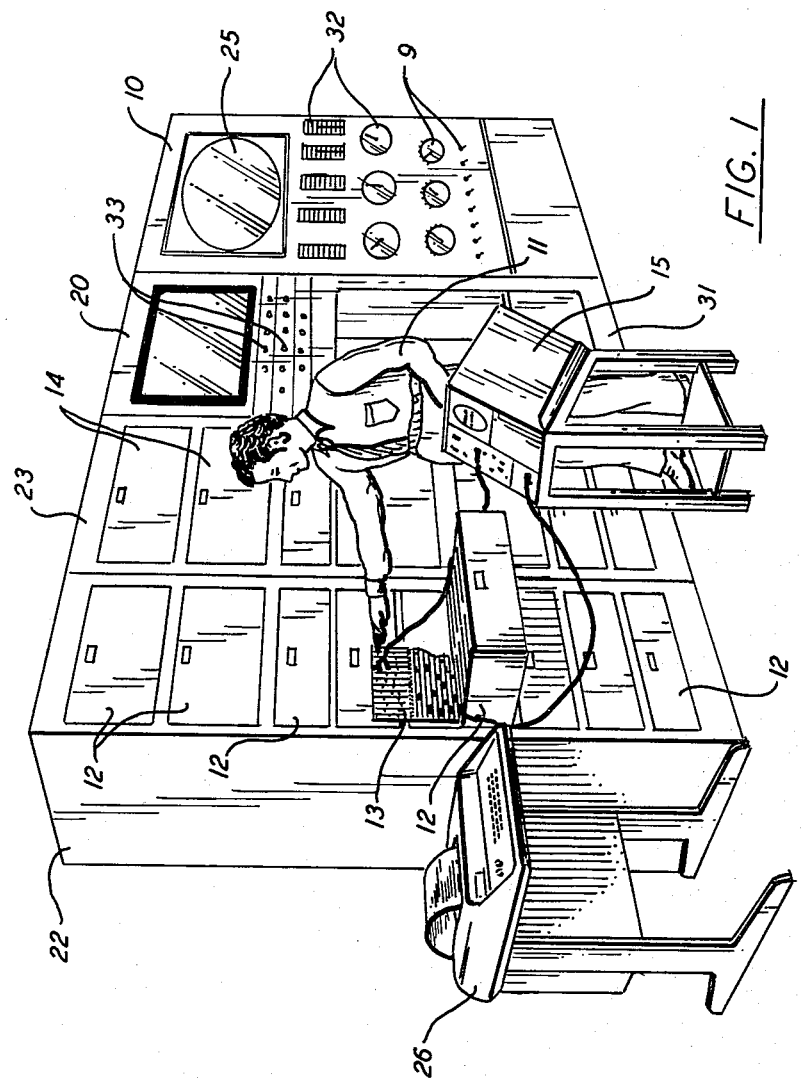
FIG. 1 is a diagram of electronic equipment and the apparatus of this invention.

Referring now to the drawings in detail and more particularly to FIG. 1, the reference character 11 represents a student who is troubleshooting electronic rack 22 that comprises a plurality of simulated drawers 12. The student may troubleshoot one of the drawers 12 by opening a drawer and placing the probes of oscilloscope 15 on the proper test points of PC card 13. Drawers 12 contain many electronic components. The electronic components contained within drawer 12 appear similar to the electronic components contained within drawers 14. Electronic rack 23 comprises a plurality of drawers 14. The electronic components contained within drawer 14 are used to drive CRT 25 and indicators 32. Since the electronic components found in drawers 12 behave like the electronic components contained in drawers 14, the student may troubleshoot the actual equipment while only touching the simulated equipment.

Handshake 31 makes computer 20 electrically and functionally compatible with racks 22 and 23. Computer 20 is used for controlling racks 22 and 23, and determining what information is going to be displayed on CRT 25 and indicators 32. As this description proceeds it will be assumed that the student 11 is trying to troubleshoot CRT 25. The instructor may, by entering certain instructions or malfunctions in input/output device 26, cause malfunctions or errors to be present in CRT 25 and cause the CRT not to function properly. The type of instruction entered into input/output device 26 determines the problem that the student will have the CRT 25. Thus if the instructor wants to have the information that is displayed on the CRT screen roll, the instructor enters a certain instruction or malfunction into input/output device 26. Input/output device 26 is a computer terminal that is used to enter and receive informtion from computer 20. Computer 20 processes the information received from devices 26 and the computer determines that the instruction was a malfunction. Thereupon computer 20 causes certain electronic components found in rack 22 to function improperly. The student now attempts to determine which electronic component contained within rack 22 caused the problem with the CRT. The CRT behaves as though something is really wrong with it, when nothing is actually wrong with the CRT. Something is wrong with the simulated components contained within simulated rack 22.

When the instructor enters a malfunction via input/output device 26, the student will diagnose the problem existing in CRT 25 by using any applicable diagnostics and handbooks that he has available. At this level of maintenance the student analysis must determine which subassembly, i.e., printed circuit card power supply, etc., is faulty. Once this is determined the student will replace the faulty simulated component with a working simulated component. If the student's diagnosis is correct the new simulated electronic component, once inserted into the system, will tell the computer that the faulty component was replaced. Now the CRT 25 will operate normally.

The foregoing technique can be applied to any faulty electronic component contained within rack 22. A program exists in computer 20 for each of the electronic components that comprise rack 22.

Figure 2:
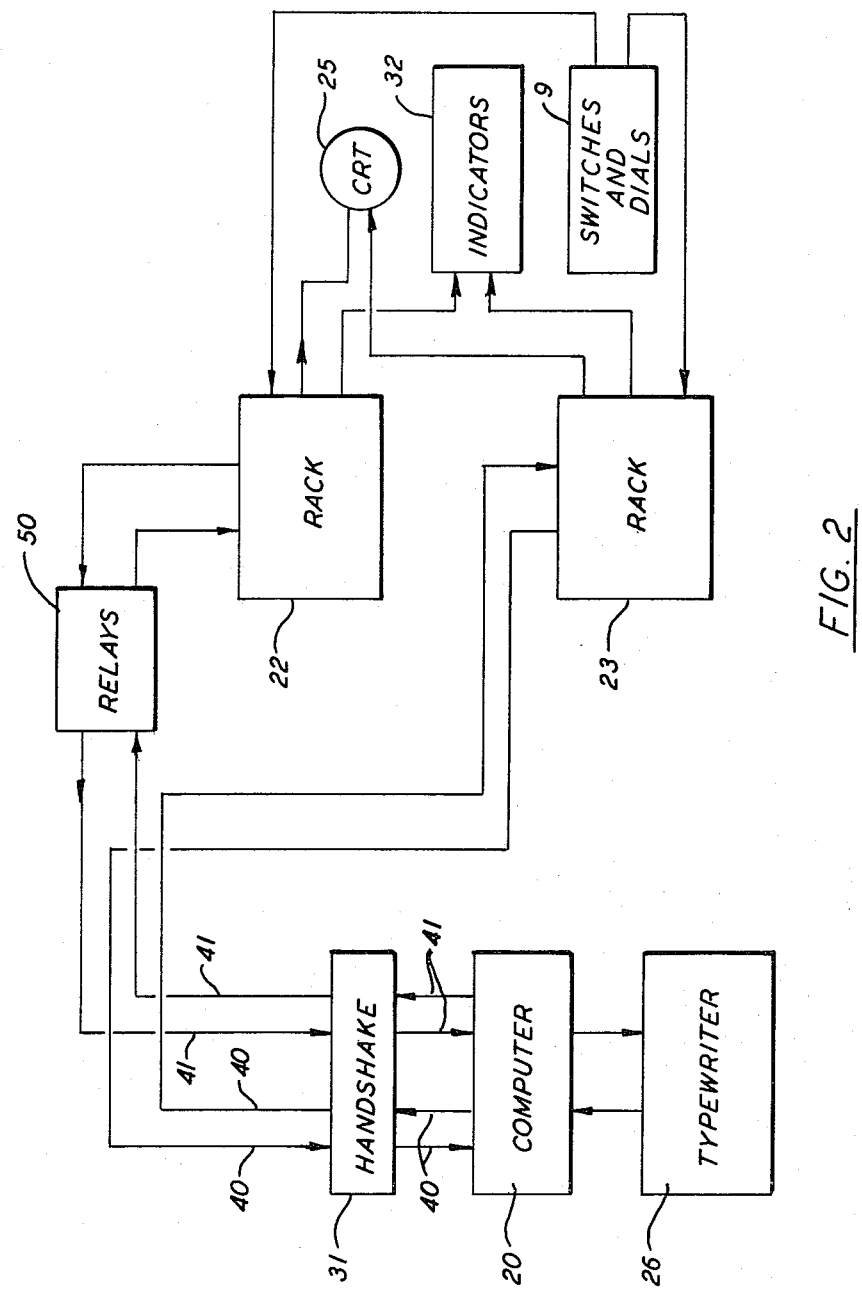
FIG. 2 is a block diagram of the system shown in FIG. 1

FIG. 2 is a logic block diagram of the system shown in FIG. 1. Computer 20 contains a simulation program. The simulation program generates signals that are used by rack 23 to drive CRT 25 and indicators 32. The simulation program is used when the instructor wishes to train a student in the operation of the equipment that is being simulated, namely the equipment contained within rack 10. Computer 20 also contains a maintenance program that is used for simulating the electronic components contained in rack 22. The maintenance program is used when the instructor wishes to teach a student how to repair and maintain the simulation equipment. Any time that the maintenance program is being run, the simulation program is also being run. However, when the maintenance program is being used rack 22 instead of rack 23 will be controlled by the simulation program. The output of computer 20 is coupled to handshake 31 via wires 40 and wires 41. The information pertaining to the maintenance program is transmitted via wires 40 and information pertaining to the simulation program is transmitted via wires 41.

Handshake 31 will make the signals that it receives from computer 20 electrically compatible with the input of relays 50 hereinafter described and the input of rack 23. Rack 23 contains a plurality of electronic components. The output of relays 50 are coupled to the input of rack 22. The output of rack 23 is used to drive CRT 25 and indicators 32. The information that is displayed on CRT 25 and indicated by indicators 32 is determined by the setting of switches and dials 9 and what is being simulated at this time. Rack 22 contains a plurality of electronic components that are similar to the electronic components contained within rack 23. The output of rack 22 is coupled to relays 50, CRT 25 and indicators 32. The output of rack 22, in accordance with switch and dial settings 9, will determine the information that is displayed by CRT 25 and indicated by indicators 32. Computer 20 is capable of running the simulation program or the maintenance and simulation programs at any given time. Which program computer 20 will run at a given time is determined by the instruction that is entered into computer 20 via typewriter 26. For instance, if the instructor decided that a maintenance program would be run he would type an instruction on typewriter 26 that would cause computer 20 to enter the maintenance program. The instructor would also enter a malfunction, i.e., an instruction that causes a particular electrical component within rack 22 to fail. When computer 20 is processing the maintenance and simulation programs, rack 23 will have no inputs and thus rack 23 will have no outputs. The information that is displayed on CRT 25 and indicators 32 will be solely controlled by the output of rack 22. Likewise, if the instructor selected only the simulation program, rack 22 would have no output. The information displayed on CRT 25 and indicators 32 would be solely determined by the output of rack 23. Rack 22 transmits signals to handshake 31 via relays 50 and line 40. Rack 23 transmits signals to handshake 31 via line 41. These signals are used to transmit information to computer 20.

The maintenance program will not cause all of the electronic components contained within rack 22 to malfunction at a given time. CRT 25 and indicators 32 may be functioning properly. Only one or more things may be wrong with them. Thus the instructor can control the type and amount of errors that would be present on CRT 25 and indicators 32. For instance, the picture on the CRT and the indicator lights may be caused to blink. While a student is being taught maintenance training the remainder of this system may be used to teach another individual how to operate the simulated equipment if the entered malfunction does not seriously hamper the simulated equipment's operation.

Figure 3:
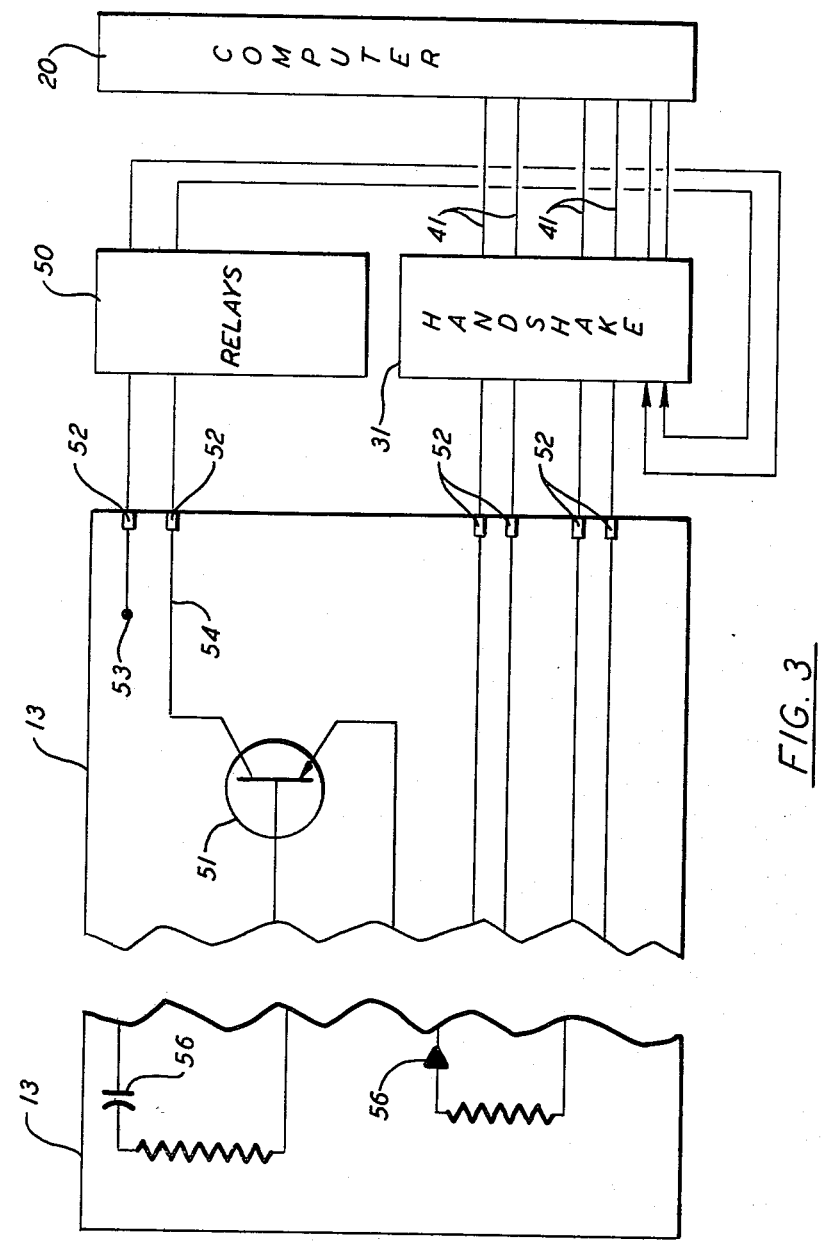
FIGS. 3–5 show details of a preferred embodiment of the system of FIG. 1.

FIG. 3 depicts sections of PC card 13. PC card 13 is one of the many simulated electronic components that are contained within drawer 12 of rack 22. Thus, PC card 13 is an example of the various types of PC cards found in drawer 12. The electronic components found on PC card 13 are the same electronic components that are found on the corresponding PC card found in rack 23.

PC card 13 is electrically and mechanically connected to drawer 12 by having someone insert the PC card connectors 52 in the proper slot in drawer 12 (not shown). Drawer 12 is connected to rack 22, and rack 22 is coupled to relays 50, CRT 25, indicators 32 and switches 9. All of the connectors of most PC cards are not usually used. PC card 13 may be modified by adding additional connectors to the card or by using the spare connectors to carry malfunction signals. Wire 54 connects transistor 51 to connectors 52. If the instructor wants transistor 51 to malfunction, he enters in typewriter 26 the proper malfunction code for that particular transistor. Computer 20 receives this information and causes a subroutine of the maintenance program to be executed which in turn causes a signal to be transmitted to handshake 31. The output of handshake 31 is coupled to a plurality of relays 50 (a specific relay is used in relays 50 for each malfunction that is going to be simulated). This signal causes a relay in relays 50 to open so that no signal may be transmitted from contact 52 through line 54 to transistor 51. Thus transistor 51 will be open and it will not be operative. Thereupon, the student will begin troubleshooting in order to find the defective component. The student will use any diagnostic programs or other information that is available. When the student isolates the defective PC card he will replace it with a good PC card. The good PC card will be identical to the replaced card except that the PC board will use a different spare connector, i.e., line 53 will be wired to transistor 51 as hereinafter described in the description of FIG. 4. If the student removes PC card 13 from this system, computer 20 knows this fact and computer 20 will not close the relay 50 until a good PC card is connected to this system. The remainder of the electronics shown on PC card 13 is depicted by character 56.

Figure 4:
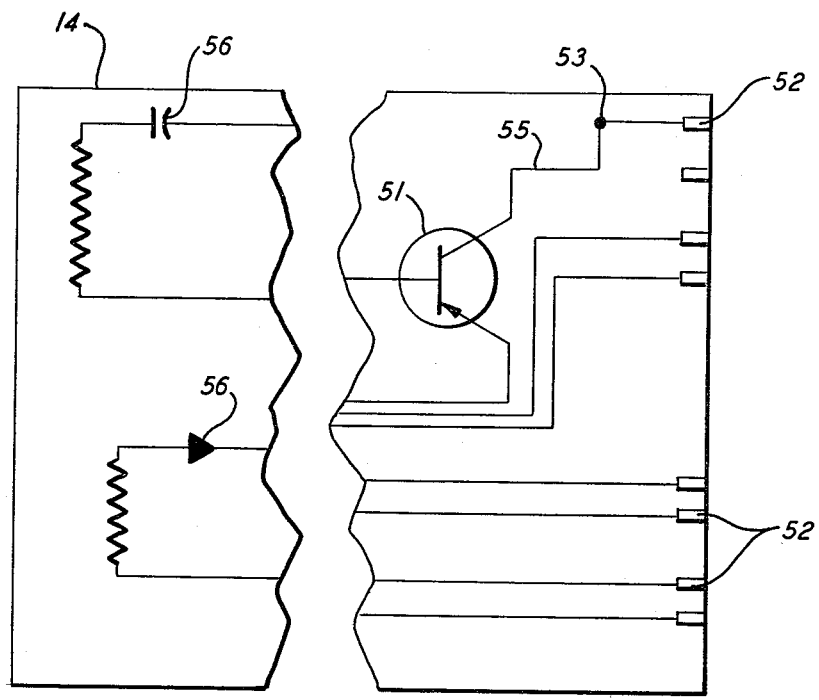

FIG. 4 is a depiction of sections of PC card 14. PC card 14 is a duplicate of PC card 13. Two identical PC cards are used for each PC card that is being simulated in rack 32. On of the identical PC cards are contained in rack 22, and the other identical PC card is used by the student to replace the first PC card if the instructor caused the card to be defective by entering a malfunction for that card. The only difference between PC card 14 and PC card 13 is that a different connector 52 is used. Wire 53 and wire 55 connects transistor 51 to connector 52. If the student places card 14 in the slot that card 13 occupied, transistor 51 would be operative because there would be a complete circuit. Since the malfunction previously entered would not be present since the signal would pass through a different relay 50. The relay 50 that is connected to line 53 would be closed, hence transistor 51 would work.

For each defective element that the instructor wants to simulate on the PC card, he must use two connections. One connection is connected to the proposed defective element on one PC card, and the other connection is connected to the element that was defective on the first card. In this manner the instructor can insert malfunctions causing an open circuit to exist on one or more PC cards. When the identical PC card with the different connection is put in the place of the first card, the entered malfunction would not be present since a different connection is used to connect that particular electronic component to the circuit. The number of defective electronic components that might be simulated on any PC card is dependent upon the number of spare connectors or added connectors that exist on the PC card and its slot in the drawer of rack 22. For some PC cards contained within rack 22 it would be possible to have a large number of electrical components found on the card to be made defective. For some other PC cards it will only be possible to simulate defects for a few components unless many additional connectors are added to the PC card.

Figure 5:
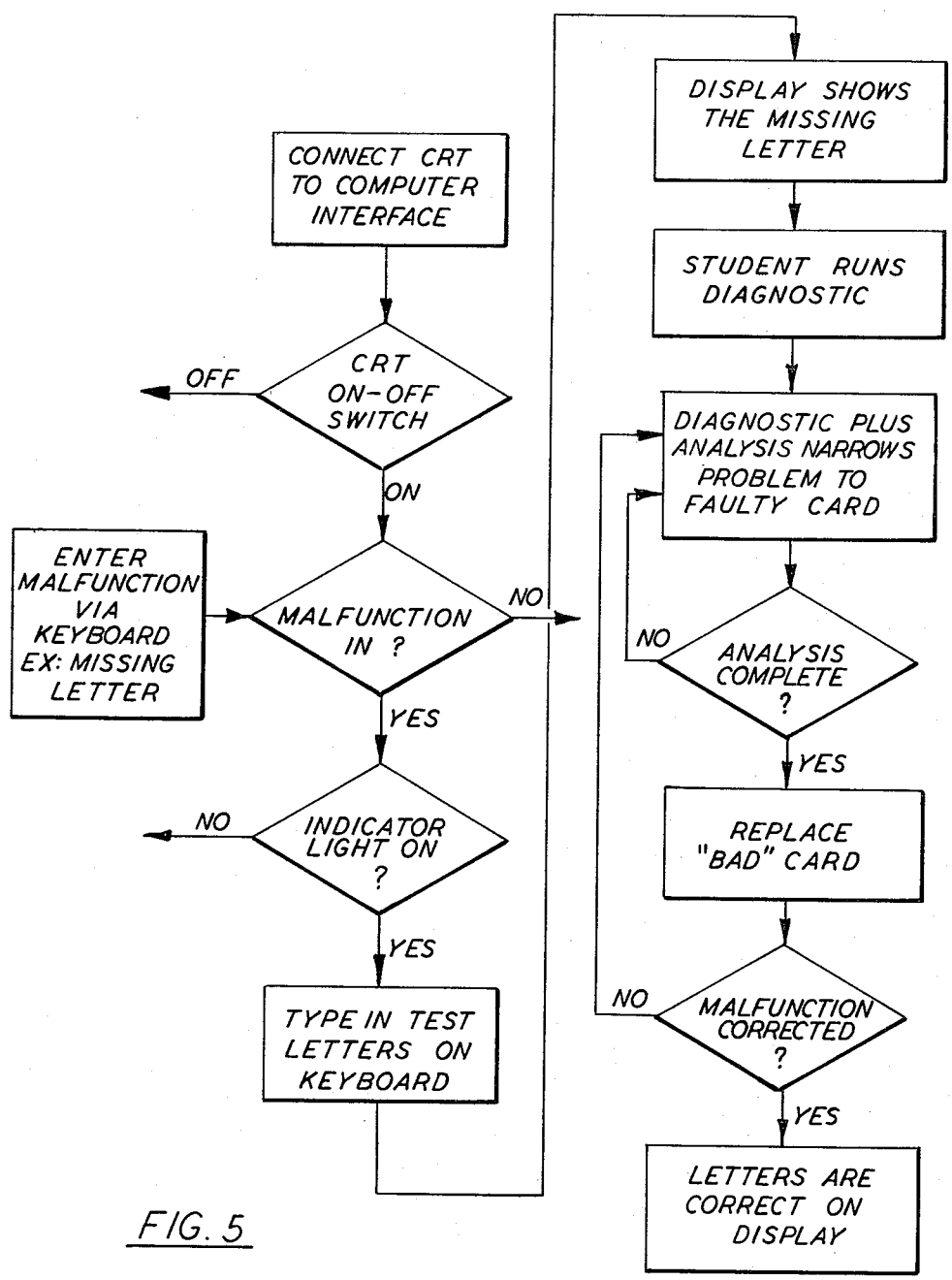

FIG. 5 shows a flow chart illustrating the steps computer 20 of FIG. 1, FIG. 2 and FIG. 3 perform to simulate the malfunctions of PC cards 13 and 14.

The above specification describes a new and improved maintenance training device. It is realized that the above description may indicate to those skilled in the art additional ways in which the principles of this invention may be used without departing from its spirit.

It is therefore intended that this invention be limited only by the scope of the appended claims.

I claim:

1. A maintenance training system for teaching students how to repair and maintain electronic systems that contain electronic components which cause certain sounds, data and information to appear on the output devices of said electronic system, said maintenance training system comprising:

a. at least two pluralities of simulated electronic components that are similar to the electronic components contained in said electronic system, the output of the first plurality of said simulated electronic components is coupled to the output devices of said electronic system, and the second plurality of said simulated electronic components is not now coupled to this system;

b. means for preventing signals from occurring at selected outputs of said simulated electronic components;

c. a computer coupled to said means, said computer contains a maintenance program; and d. an instructor controlled input/output device coupled to said computer, said input/output device permits the instructor to enter malfunctions into the computer which will instruct the maintenance program contained in said computer to cause simulated defects to exist on one or more of said simulated electronic components so that the output devices of said electronic system will not function properly, whereby a student will have the opportunity to try and find which one or ones of said first plurality of electronic components are not functioning properly, and when the student finds the one or more of said simulated first plurality of defective components, he will replace that said simulated electronic component contained within said first plurality of electronic components with a similar said second plurality electronic component so that the simulated defect or defects that existed in this system will be removed and the output devices of said electronic system will function properly.

2. The system claimed in claim 1 wherein said means comprises a plurality of relays, one of said plurality of relays being to each simulated defect of said first plurality of electronic components.

3. The system claimed in claim 1 wherein said first plurality of simulated electronic components comprises: a first plurality of PC cards whose outputs are coupled to said electronic system and said means by a plurality of connections, some of said first plurality of connections are used when this system simulates a defect in said first plurality of simulated electronic components, at least one connector from each PC card that comprises said first plurality of PC cards is coupled to a connection and an electronic component on said PC card and said means so that an open circuit will be produced when said computer informs said means to cause that particular electronic component to be defective.

4. The system claimed in claim 1 wherein said second plurality of simulated electronic components comprises: a second plurality of PC cards whose outputs are coupled to said electronic system and said means by a plurality of connections, some of said second plurality of connections are used when this system simulates a defect in said second plurality of simulated electronic components, at least one connector from each PC card that comprises said second plurality of PC cards is coupled to a connection and an electronic component of said PC card and said means so that an open circuit will be produced when said computer informs said means to cause that particular electronic component to be defective.

5. The system claimed in claim 1 wherein:

said first plurality of simulated electronic components comprises a first plurality of PC cards whose outputs are operatively connectable to said electronic system and said means by a plurality of connections, some of said plurality of connections are used when this system simulates a defect in said first plurality of simulated electronic components, at least one connector from each PC card that comprises said first plurality of PC cards is coupled to a connection and an electronic component on said PC card and said means so that an open circuit will be produced when said computer informs said means to cause that particular electronic component to be defective; and said second plurality of simulated electronic components comprises a second plurality of PC cards whose outputs are operatively connectable to said electronic system and said means by said plurality of connections, some of said plurality of connections are used when this system simulates a defect in said second plurality of simulated electronic components, at least one connector from each PC card that comprises said second plurality of PC cards is coupled to a connection and an electronic component on said PC card and said means so that an open circuit will be produced when said computer informs said means to cause that particular electronic component to be defective, wherein said open-circuit connector of each PC card of said first plurality of PC cards is operatively connectable to a different one of said plurality of connections than is said open-circuit connector of each PC card of said second plurality of PC cards, whereby replacement of one of either plurality of PC cards which has been made defective by said means, with a similar PC card from the other plurality of PC cards, removes the open circuit from operative connection in said system.

6. Apparatus for training of personnel in repair of equipment simulated by such apparatus, comprising:

a socket for an electronic component and including first and second contacts;

a first electronic component operatively and removably engaging said socket and substantially similar in function and appearance to an actual electronic component of the equipment, and including a first connector operatively connected to an electrical defect of said first component and configured to operatively engage said first contact, and further including a second connector operatively connected to a first element of said first component and configured to operatively engage said second contact;

a second electronic component configured to operatively engage said socket and substantially similar in function and appearance to the same actual electronic component of the equipment, and including a third connector operatively connected to an electrical defect of said second component and configured to operatively engage said second contact, and further including a fourth connector operatively connected to a second element of said second component identical to said first element and configured to operatively engage said first contact;

switching means responsive to a switching signal and configured to be electrically connected to either said first contact or to said second contact in response to said switching signal; and controller means operatively connected to said switching means for providing said switching signal to said switching means, whereby said switching means operatively connects said controller means to said first contact or to said second contact in response to said switching signal, whereby replacement in said socket of said first component with second component connects an electrical defect to said switching means or removes an electrical defect therefrom, depending upon said switching signal.

7. Apparatus as recited in claim 6, further comprising: display means operatively connected to said socket for indicating the quality of performance of said first or second component operatively engaging said socket.

8. Apparatus as recited in claim 6 wherein said switching means comprises a relay.

9. Apparatus as recited in claim 6 wherein said controller means comprises a computer.

10. Apparatus for training of personnel in repair of a simulator simulated by such apparatus, comprising:

a display substantially similar in appearance and function to that of the simulator;

a socket for an electronic component connected to said display and including first and second contacts;

a first electronic component operatively and removably engaging said socket and substantially similar in function and appearance to an actual electronic component of the equipment, but including a first connector operatively connected to an open circuit of said first component and configured to operatively engage said first contact, and further including a second connector operatively connected to a first element of said first component and configured to operatively engage said second contact;

a second electronic component configured to operatively engage said socket and substantially similar in function and appearance to the same actual electronic component of the equipment, but including a third connector operatively connected to an open circuit of said second component and configured to operatively engage said second contact, and further including a fourth connector operatively connected to a second element of said second component identical to said first element and configured to operatively engage said first contact;

switching means responsive to a switching signal and configured to be electrically connected to either said first contact or to said second contact in response to said switching signal; and controller means operatively connected to said switching means for providing said switching signal to said switching means, whereby said switching means operatively connects said controller means to said first contact or to said second contact in response to said switching signal, and for operation with said electronic component of said display similar to operation of the display of the simulator, whereby connection of an open circuit to said switching means adversely affects the quality of presentation of said display;

whereby replacement in said socket of said first component with said second component connects an open circuit to said switching means or removes an open circuit therefrom, depending upon said switching signal.

11. Apparatus as recited in claim 10 wherein said switching means comprises a relay.

12. Apparatus as recited in claim 10 wherein said controller means comprises a computer.

* * * * *